US012640603B2

(12) United States Patent (10) Patent No.: US 12,640,603 B2
Luo et al. (45) Date of Patent: May 26, 2026

(54) MAGNETIC FLUX REDUCING CIRCUITS FOR MITIGATING MAIN BEARING CURRENT IN ELECTRIC MOTORS AND GEARBOXES

(71) Applicant: GM GLOBAL TECHNOLOGY OPERATIONS LLC, Detroit, MI (US)

(72) Inventors: Yilun Luo, Ann Arbor, MI (US); Jack M. Gayney, Grosse Ile, MI (US); John A. Diemer, Royal Oak, MI (US); Patrick S. Portell, Clarkston, MI (US); Sanjeev M. Naik, Troy, MI (US); Azadeh Narimissa, Lake Orion, MI (US); Mohammad F. Momen, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 202 days.

(21) Appl. No.: 18/506,693

(22) Filed: Nov. 10, 2023

(65) Prior Publication Data

US 2025/0158461 A1 May 15, 2025

(51) Int. Cl.
H02K 1/24 (2006.01)
H02K 5/173 (2006.01)
H02K 9/19 (2006.01)
H02P 23/14 (2006.01)

(52) U.S. Cl.
CPC ............. H02K 1/246 (2013.01); H02K 5/173 (2013.01); H02K 9/19 (2013.01); H02P 23/14 (2013.01)

(58) Field of Classification Search
CPC .......... H02K 1/246; H02K 5/173; H02K 9/19; H02K 11/40; H02P 23/14
See application file for complete search history.

(56) References Cited

U.S. PATENT DOCUMENTS

| | | | |
|---|---|---|---|
| 8,975,798 B1 * | 3/2015 | Larive .................. | H02K 11/028 310/90 |
| 2017/0207673 A1 * | 7/2017 | Kinjo ..................... | H02K 1/146 |
| 2017/0234367 A1 * | 8/2017 | Yoshino ................... | B23Q 1/70 384/467 |
| 2022/0216772 A1 * | 7/2022 | Wei .......................... | F16C 19/52 |

FOREIGN PATENT DOCUMENTS

| | | | | | |
|---|---|---|---|---|---|
| CN | 107947492 A | * | 4/2018 | ............. | H02K 5/145 |
| DE | 102005045960 A1 | * | 4/2007 | .......... | H01R 39/646 |
| DE | 10 2006 007 434 A1 | | 8/2007 | | |
| DE | 10 2007 019 828 B3 | | 10/2008 | | |
| DE | 10 2010 064 016 A1 | | 6/2012 | | |

(Continued)

OTHER PUBLICATIONS

Office Action issued Jul. 17, 2024 in German Application No. 10 2024 100 218.2; 18pgs.

*Primary Examiner* — Thomas Truong

(57) ABSTRACT
A motor system includes: a stator connected to a case of a motor; main bearings connected to the case; a main shaft rotating on the main bearings; a rotor mounted on the main shaft and rotating relative to the stator; and at least one of a magnetic flux reducing circuit element and a conductive rolling-element device disposed inward of the main bearings and closer to the stator and the rotor than the main bearings and reducing flow of bearing current through the main bearings.

19 Claims, 11 Drawing Sheets

(56) References Cited

FOREIGN PATENT DOCUMENTS

| | | | |
|----|----------------------|-----|---------|
| DE | 10 2014 018 449 B3 | | 6/2016 |
| DE | 10 2015 205 028 A1 | | 6/2016 |
| DE | 10 2016 209 399 A1 | | 11/2017 |
| DE | 10 2018 107 206 A1 | | 10/2019 |
| DE | 10 2013 223 673 B4 | | 10/2021 |
| DE | 10 2020 115 977 A1 | | 12/2021 |
| DE | 10 2021 214 385 A1 | | 2/2023 |
| JP | 2014143865 A | * | 8/2014 |

* cited by examiner

MAGNETIC FLUX REDUCING CIRCUITS FOR MITIGATING MAIN BEARING CURRENT IN ELECTRIC MOTORS AND GEARBOXES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motors, and more specifically to circuits for reducing circulating bearing current (CBC), electrical discharge machining (EDM) current, and leakage current in electric motors and gearboxes.

An electric machine can include an electric motor and a gearbox (or gear case). A power source can supply a direct current (DC) voltage to an inverter, which converts the DC voltage to an alternating current (AC) voltage. The AC voltage drives a stator of the electric motor, which in turn rotates a rotor and a shaft of the electric motor. The rotating shaft drives gears of the gearbox. In a vehicle, the gearbox can be connected to one or more drive shafts that are used to propel the vehicle.

SUMMARY

A motor system is disclosed and includes: a stator connected to a case of a motor; main bearings connected to the case; a main shaft rotating on the main bearings; a rotor mounted on the main shaft and rotating relative to the stator; and at least one of a magnetic flux reducing circuit element and a conductive rolling-element device disposed inward of the main bearings and closer to the stator and the rotor than the main bearings and reducing flow of bearing current through the main bearings.

In other features, the at least one of the magnetic flux reducing circuit element and the conductive rolling-element device includes at least two conductive rolling-element devices.

In other features, the at least one of the magnetic flux reducing circuit element and the conductive rolling-element device includes a conductive bearing, brush or spring in contact with the main shaft.

In other features, the at least one of the magnetic flux reducing circuit element and the conductive rolling-element device reduces or eliminates electrical discharge machining bearing current through the main bearings.

In other features, the at least one of the magnetic flux reducing circuit element and the conductive rolling-element device is disposed on the main shaft.

In other features, the at least one of the magnetic flux reducing circuit element and the conductive rolling-element device is disposed within the main shaft.

In other features, the at least one of the magnetic flux reducing circuit element and the conductive rolling-element device at least one of i) operates as a current divider, and ii) reduces an amount of change in magnetic flux of the motor.

In other features, the at least one of the magnetic flux reducing circuit element and the conductive rolling-element device grounds the main shaft.

In other features, the at least one of the magnetic flux reducing circuit element and the conductive rolling-element device has less impedance than one of the main bearings.

In other features, the at least one of the magnetic flux reducing circuit element and the conductive rolling-element device comprises conductive fluid.

In other features, the at least one of the magnetic flux reducing circuit element and the conductive rolling-element device is preloaded.

In other features, the at least one of the magnetic flux reducing circuit element and the conductive rolling-element device has at least one of a smaller inner diameter and a smaller outer diameter than one of the main bearings.

In other features, the motor system further includes at least one of a preloading element and a conductive element extending from the at least one of the magnetic flux reducing circuit element and the conductive rolling-element device to a member of the case.

In other features, the motor system further includes the preloading element preloading the at least one of the magnetic flux reducing circuit element and the conductive rolling-element device. The preloading element includes at least one of a wire, a stranded and braided wire, a Litz wire, a ribbon, and a slip spring.

In other features, at least one of the main bearings includes a stacked ball bearing arrangement.

In other features, the motor system further includes: a pair of temperature-controlled elements disposed adjacent the main bearings; a first set of fluid lines circulating a first fluid through the pair of temperature-controlled elements; another temperature-controlled element disposed adjacent the at least one of the magnetic flux reducing circuit element and the conductive rolling-element device; and a second set of fluid lines circulating the first fluid or a second fluid through the another temperature-controlled element, wherein fluid flowing through the another temperature-controlled element is warmer than fluid flowing through the pair of temperature-controlled elements.

In other features, the first set of fluid lines is not connected to and is independent of the second set of fluid lines.

In other features, a motor system is disclosed and includes: a stator connected to a case of a motor; main bearings connected to the case; a main shaft rotating on the main bearings; a rotor mounted on the main shaft and rotating relative to the stator; and at least two magnetic flux reducing circuit elements disposed outward of the main bearings and further from the stator and the rotor than the main bearings and reducing flow of bearing current through the main bearings.

In other features, a motor system is disclosed and includes: a stator connected to a case of a motor; main bearings connected to the case; a main shaft rotating on the main bearings; a rotor mounted on the main shaft and rotating relative to the stator; at least one of a magnetic flux reducing circuit element and a conductive rolling-element device configured to reduce flow of bearing current through the main bearings; a pair of temperature-controlled elements disposed adjacent the main bearings; a first set of fluid lines circulating a first fluid through the pair of temperature-controlled elements; another temperature-controlled element disposed adjacent the at least one of the magnetic flux reducing circuit element and the conductive rolling-element device; and a second set of fluid lines circulating the first fluid or a second fluid through the another temperature-controlled element. Fluid flowing through the another temperature-controlled element is warmer than fluid flowing through the pair of temperature-controlled elements.

In other features, the motor system further includes: a pumping circuit configured to control flow of the first fluid to and from the first set of fluid lines and flow of the first fluid or the second fluid to and from the second set of fluid lines; and a control module configured to control operation of the pumping circuit to control temperatures of the main bearings and the at least one of the magnetic flux reducing circuit element and the conductive rolling-element device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An electric motor typically includes a stator, a rotor and a main shaft. The rotor is connected to the main shaft and is rotated relative to the stator. The inverter converters the DC power into AC voltage and current to coils of the stator to generate a magnetic field, which causes the rotor and thus the main shaft to rotate. The stator is supplied a CMV and a common mode current (CMC) via an inverter as a byproduct. The main shaft rotates on main bearings that are located near ends of the main shaft.

Figure 1:
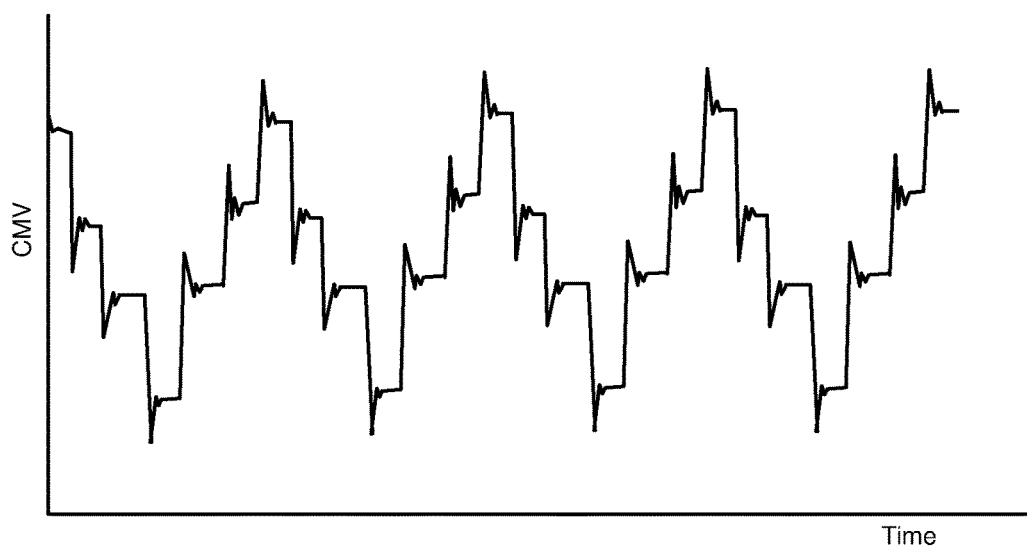
FIG. 1 is an example common mode voltage (CMV) signal.

The inverter performs a switching operation to convert a DC supply voltage to an AC supply voltage that is supplied to the stator. The CMV does not have a pure sinusoidal pattern but rather has a step-like (or "choppy") pattern due to the switching of the inverter, as shown in FIG. 1. The rise and fall transitions of "steps" of the CMV referred to as dV/dt (or changes in CMV over time). The changes in the CMV cause the CMC, which in turn causes changes in magnetic flux (or $d\Phi/dt$). The CMC (or $I_{CMC}$) is equal to a product of a parasitic capacitance of the motor and $dV_{CMV}/dt$. Part of the CMC flows through the bearing and rotor shaft and becomes the circulating bearing current (CBC), which is equal to a voltage Vshaft across the main shaft of the motor divided by a resistance Rshaft of the main shaft.

Figure 2:
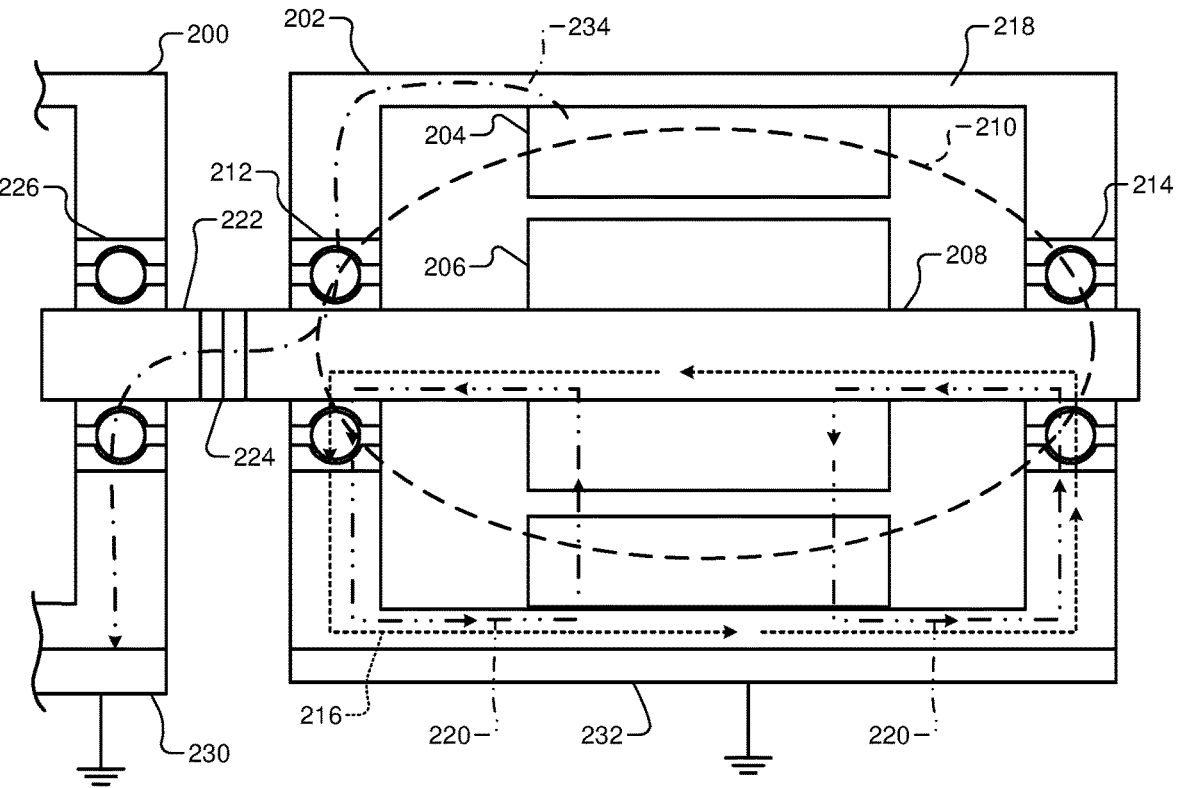
FIG. 2 is a cross-sectional side view of an example gearbox and motor illustrating CBC, EDM bearing current, leakage current, and magnetic flux area associated with CBC.

The magnetic flux occurs over an area that extends across the stator and across the motor between the main bearings, as shown in FIG. 2. FIG. 2 shows a gearbox 200 and a motor 202. The motor 202 includes a stator 204, a rotor 206 and a main shaft 208 that rotates with the rotor 206. An area of the magnetic flux is represented by oval 210 and causes the voltage Vshaft measured across the main shaft 208 from a point at a first main bearing 212 to a point at the second main bearing 214. The voltage across the shaft Vshaft causes a circulating bearing current (CBC), represented by dashed arrows 216, which flows through the main shaft 208, through the bearings 212, 214, and through the case 218.

EDM bearing current occurs due to accumulated voltage on the main shaft 208. Unlike CBC, EDM bearing current occurs somewhat randomly and depends on how often a voltage threshold is exceeded for the main bearings 212, 214. The voltage threshold may refer to a voltage when current begins to flow through oil, lubricant, or grease of the main bearings 212, 214. The frequency of CBC is the same as or proportional to the switching frequency of current supplied to the stator 204. The frequency of EDM bearing current is however not the same as the switching frequency of current supplied to the stator 204. EDM bearing current is represented by arrows 220 and flows through the stator 204, the rotor 206, the case 218, and the main bearings 212, 214.

The main shaft 208 is coupled to a shaft 222 of the gearbox 200 via a coupler 224, or via gears. The shaft 222 rotates on bearings (e.g., bearing 226 is shown). The gearbox 200 and the motor 202 may be mounted on base plates 230, 232, which may be grounded, as shown. Leakage current can occur from the stator 204 through the case 218, the main bearings 212, the coupler 224 (or the gears), the shafts 208, 222, and the bearing 226 to the base plate 230. This is represented by dashed arrow 234. The leakage current can damage the gearbox bearing 226 and gears of the gearbox 200 and can cause fluting of the gears.

The dV/dt instances that occur in the CMC due to inverter switching of the current supplied to the motor 202 causes microscale discharges to occur between bearing surfaces (i.e., between surfaces of ball bearings and bearing carriers (or races)). These discharges can occur at high-frequencies and can result in pitting, frosting and fluting of the bearing surfaces. This causes damage to the bearing surfaces and results in increased operational noise and reduced operating efficiency of the motor 202.

Bearing current, including CBC and EDM bearing current, is a challenging problem for electric machine systems including motors and/or generators. This is true of battery, hybrid, and fuel cell electric vehicles including automobiles, trains, and ships, and is also true of wind turbines. Bearing current can result in damage to motor bearings, gear bearings, gears, and their lubricants and result in noise, vibration and harshness (NVH) issues, gear and bearing failures, motor and gearbox failures, and costly recalls.

The examples set forth herein include magnetic flux reducing circuits and conductive rolling-element devices which reduce magnetic flux area, CBC, Vshaft, EDM bearing current, and leakage current of motors and corresponding gearboxes. The examples include conductive bearing grounding elements and other grounding elements at various locations within motors and gearboxes that mitigate CBC, EDM bearing current and leakage current. The examples further include motor and gearbox impedance relationships for minimizing current through main bearings of motors and bearings of gearboxes. The examples further include temperature control circuits for adjusting temperatures of main bearings, magnetic flux reducing circuit elements and conductive rolling-element devices. Conductive rolling-element devices may include bearings, brushes, clips, springs, slip rings, bearing without the rolling elements but filled with conductive fluid inside, etc. that are in contact with a rotating element, such as a rotating shaft or an element connected to and rotating with the rotating shaft. Magnetic flux reducing circuit elements include the conductive rolling-element devices and other devices such as i) elements that do not include a rolling element such as a ball bearing, and ii) elements that are disposed between conductive rolling element devices and other elements of a motor (e.g., a case or other structural element of the motor). The elements disposed between the conductive rolling element devices and other elements of a motor may include: conductive bars, arms, and/or structure; solid and/or braided sheet and/or wires; preloading devices such as springs; etc. The conductive rolling-element devices provide better conductivity and durability than a carbon brush or stick. The conductive rolling-element devices may be grounded or not grounded.

In an embodiment, grounding elements, including conductive bearings, conductive brushes and/or clips, slip rings, rotary devices, and/or conductive fluid, are implemented in a motor and/or a corresponding gearbox to protect the motor bearings and/or gearbox bearings and gears from bearing current and associated discharges. Examples include providing grounding elements with less impedance than impedances of main bearings and/or gears to reduce current through the main bearings and gears. The lower impedances are provided: by including preloaded elements; by preloading elements; by using conductive or less-viscous oil; by reducing oil thickness; by installing on the surface (inner or outer) to mitigate the skin effect, and/or by providing elements with increased or decreased contact areas.

The magnetic flux reducing circuit elements may be located in various locations within motors and corresponding gearboxes. Each motor may have one or more magnetic flux reducing circuit elements. Magnetic flux reducing circuit elements may be mounted on one or both ends of a rotor/gear shaft. Compared to an inverter choke, the magnetic flux reducing circuit elements, which may be implemented on a grounding cable between a motor/drive unit and a vehicle ground is more efficient and cost-effective for bearing current reduction. The magnetic flux reducing circuit elements i) reduce CBC by reducing dϕ/dt, ii) provide a current divider that bypassing bearing current, and iii) ground the main shaft of the motor to minimize and/or eliminate EDM bearing current.

The examples disclosed herein are reliable and effective countermeasures for both CBC and EDM bearing current. The examples provide improved bearing current bypassing, reduction and grounding with reduced main bearing impedance, friction and wear.

The examples of FIGS. 3-15 include various features. Some of these features are not shown in all of the figures but are applicable to all of the examples of these figures.

Figure 3:
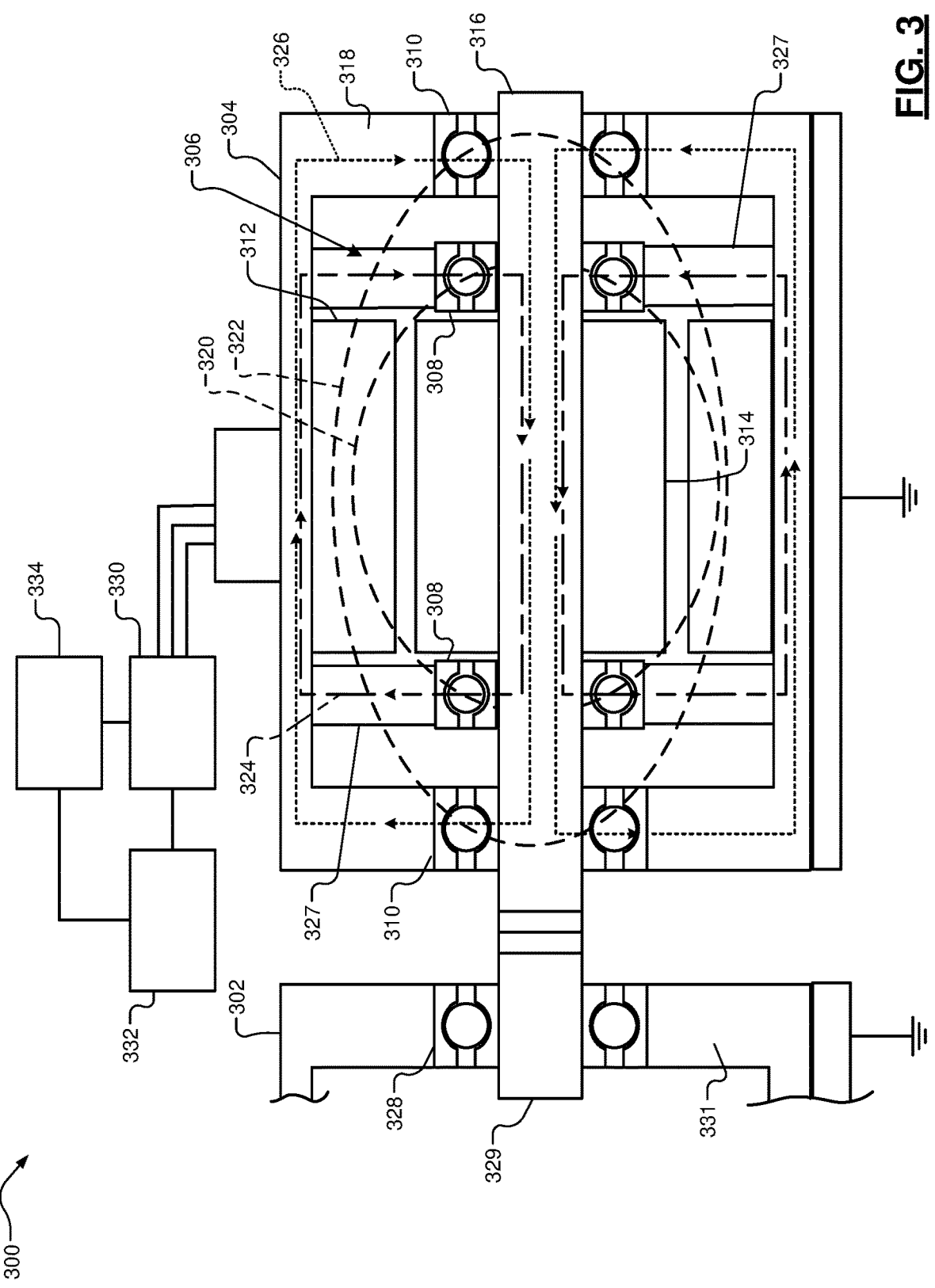
FIG. 3 is a functional block diagram of a motor control system including a cross-sectional side view of an example gearbox and motor including a magnetic flux reducing circuit including magnetic flux reducing circuit elements disposed inward of motor main bearings in accordance with the present disclosure.

FIG. 3 shows a motor control system 300 including an example gearbox 302 and motor 304 including a magnetic flux reducing circuit 306. The magnetic flux reducing circuit 306 includes one or more magnetic flux reducing circuit elements 308 (two are shown) disposed inward of motor main bearings 310. The motor 304 includes a stator 312, a rotor 314, and a main shaft 316. The stator 312 is mounted on a case 318. The magnetic flux reducing circuit elements 308 are implemented in this example as ring-shaped bearings. The magnetic flux reducing circuit elements 505 may also include or alternatively be other conductive devices, such as brushes, slip rings, clips, etc. The main bearings 310 are also ring-shaped. The main shaft 316 extends through the magnetic flux reducing circuit elements 308 and the main bearings 310. Each of the magnetic flux reducing circuit elements 308 and the main bearings 310 includes a pair of bearing carriers (or races) and bearing balls riding on and between the races. The magnetic flux reducing circuit elements 308 reduce a magnetic flux area of CBC and reduce, minimize, and/or eliminate CMC and EDM bearing current through the main bearings 310. The reduced magnetic flux area is represented by oval 320. The magnetic flux area that would be associated with the main bearings 310, if the magnetic flux reducing circuit elements 308 were not included, is represented by oval 322. Current through the magnetic flux reducing circuit elements 308 is represented by arrows 324. Current, if any, through the main bearings 310 is represented by arrows 326. The magnetic flux reducing circuit elements 308 may be connected to the case 318, conductive members of the case, and/or conductive members extending from the case, such as conductive members 327.

The gearbox 302 includes a bearing 328 and a shaft 329, which may be coupled to the main shaft 316 directly or via two or more gears. The magnetic flux reducing circuit elements 308 reduce and/or prevent leakage current from flowing through the shaft 316, the bearing 328 and the case 331 of the gearbox 302.

The motor 304 may receive CMV and CMC from an inverter circuit 330, which receives power from a power source 332, such as a battery pack of a vehicle. A control module 334 controls and/or monitors the power source 332, controls the inverter circuit 330, and thus controls operation of the motor 304. The CMV and CMC may be provided to the stator 312.

Figure 4:
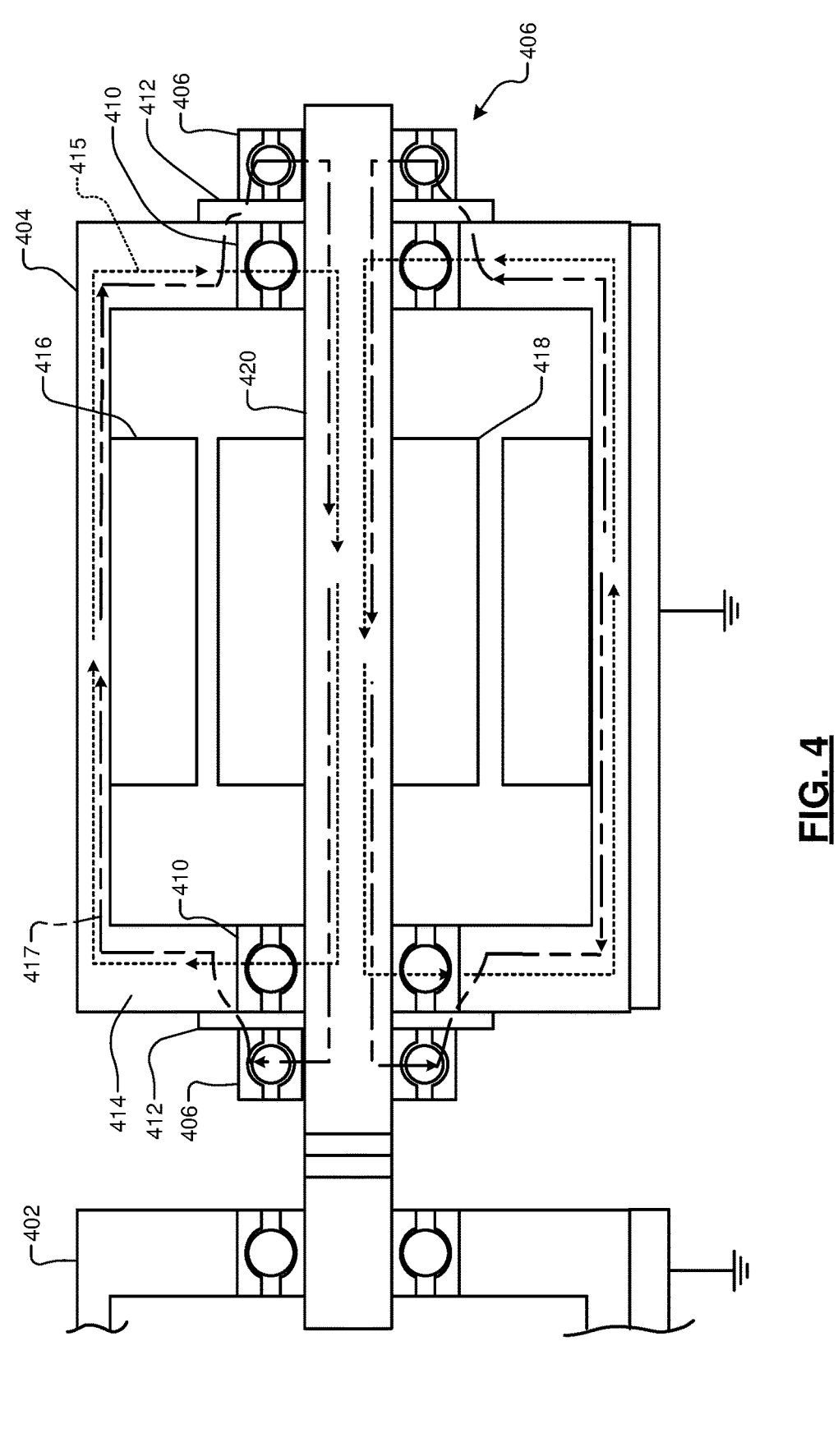
FIG. 4 is a functional block diagram of a motor system including a cross-sectional side view of an example gearbox and motor including conductive rolling-element devices disposed outward of motor main bearings in accordance with the present disclosure.

FIG. 4 shows a motor system 400 including an example gearbox 402 and motor 404. The motor 404 includes one or more conductive rolling-element devices 406 (two are shown) that are disposed outward of motor main bearings 410. The conductive rolling-element devices 406 may alternatively be other conductive devices, such as brushes, slip rings, clips, etc. The conductive rolling-element devices 406 may be mounted onto plates 412, which are mounted onto a case 414 of the motor 404. The motor 404 includes a stator 416 and a rotor 418 that rotates with a main shaft 420. Bearing current through the main bearings 410 is represented by arrows 415. Bearing current through the conductive rolling-element devices 406 is represented by arrows 417. The bearing current through the main bearings 410 is reduced by having at least some of the bearing current passing through the conductive rolling-element devices 406.

Figure 5:
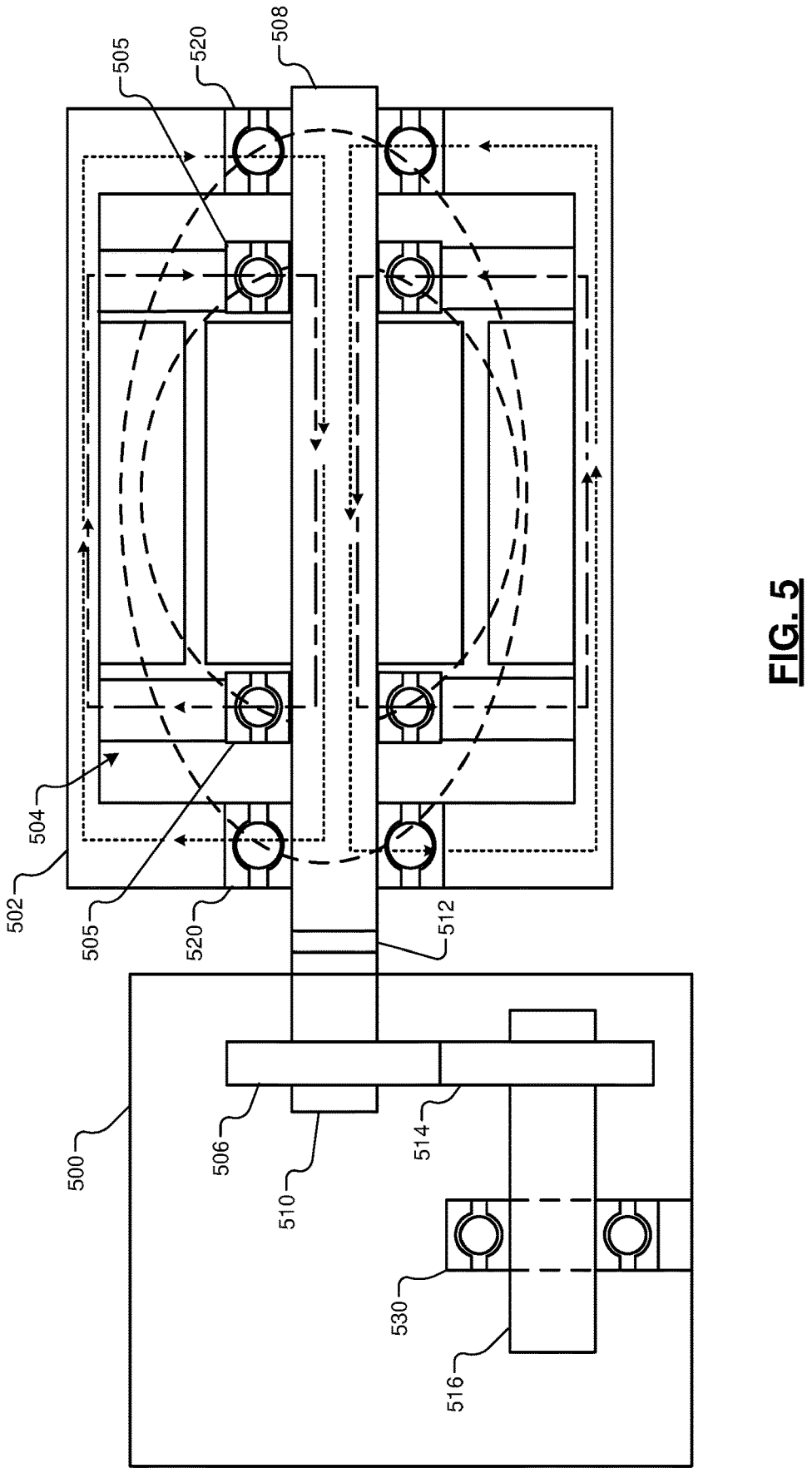
FIG. 5 is a cross-sectional side view of an example gearbox including high impedance gears and a motor including a magnetic flux reducing circuit in accordance with the present disclosure.

FIG. 5 shows an example gearbox 500 including high impedance gears and a motor 502 including a magnetic flux reducing circuit 504 having magnetic flux reducing circuit elements 505. The magnetic flux reducing circuit elements 505 may also include or alternatively be other conductive devices, such as brushes, slip rings, clips, etc. The gearbox 500 may include a first gear 506 connected to the main shaft 508 of the motor 502 via a first shaft 510 and/or a coupler 512. The gearbox 500 may further include a second gear 514 that is engaged with the first gear 506 and is connected to a second shaft 516. The impedances of the gears 506, 514 and/or the shafts 510, 516 may be higher than impedances of the main bearings 520 of the motor 502. This may include forming the gears 506, 514 and/or the shafts 510, 516 of different material(s) than material(s) of the main bearings 520 to have higher impedances than the main bearings 520. This decreases the amount of leakage current flowing from the motor 502 and through the main bearings 520 and through components of the gearbox 500, such as the gears 506, 514 and shafts 510, 516.

In an embodiment, the shaft 516 includes one or more magnetic flux reducing circuit elements and/or conductive rolling-element devices (e.g., the magnetic flux reducing circuit elements 505), which may be axially inward or outward of the gear 514. One conductive rolling-element device 530 is shown, which may be provided in addition to other (or main) bearings on the shaft 516. The conductive rolling-element device 530 may alternatively be one or more other conductive devices, such as brushes, slip rings, clips, etc. Although not shown, a conductive rolling-element may be located on the shaft 510 axially inward and/or outward of the gear 514. The conductive rolling-element devices located on the shafts 510, 516 may be provided to minimize current passing through the gears 506, 514, the shaft 516, and/or other bearings on the shaft 510 and/or the shaft 516.

Figure 6:
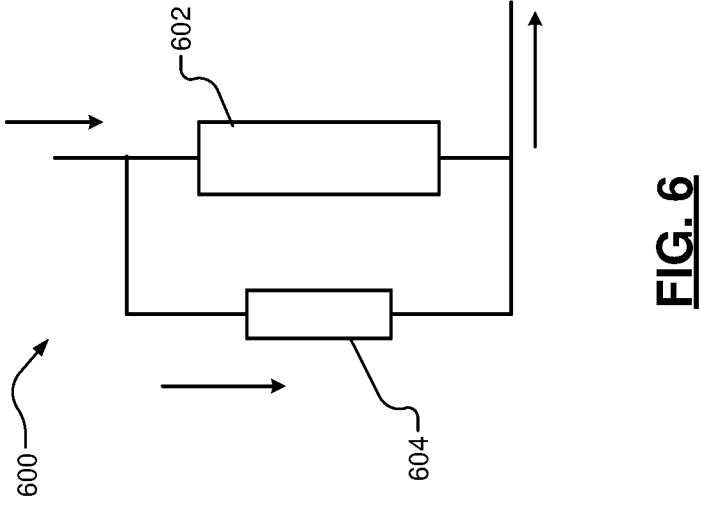
FIG. 6 is an impedance circuit representative of impedances of a main bearing relative to impedance of a magnetic flux reducing circuit element or a conductive rolling-element device in accordance with the present disclosure.

FIG. 6 shows an impedance circuit 600 representative of impedances 602, 604 respectively of a main bearing, such as any of the main bearings referred to herein, and an impedance 604 of a magnetic flux reducing circuit element or a conductive rolling-element device. The impedances of the main bearings may be more than the impedances of the magnetic flux reducing circuit elements and/or conductive rolling-element devices referred to herein. This may be accomplished by having the materials of the main bearings have higher impedances than impedances of the conductive rolling-element devices. The impedances are connected in parallel. The magnetic flux reducing circuit elements can have a shorter current flow path than those of the main bearings, leading to a lower impedance. The lubricant, oil, and/or grease of the main bearings may have higher impedance than the conductive lubricant, oil and/or grease of the magnetic flux reducing circuit elements and conductive rolling-element devices. The impedance of the magnetic flux reducing circuit elements have reduced impedance at frequencies of bearing current (e.g., at 1.5 megahertz (MHz)). By providing a parallel arrangement, the bearing current is split into current passing through the main bearings and other current passing through the magnetic flux reducing circuit elements and conductive rolling-element devices.

The impedance of a bearing including inner and outer races (or bearing carriers) and bearing balls, is based on the impedances of the inner and outer races, impedances of the bearing balls or bearing rollers, and impedances of oil (or lubricant) layers between the races and the ball bearings. The oil (or lubricant) may coat the bearing balls. By reducing radii of the races and radius of each bearing ball or bearing roller, the impedances of the races and the ball bearings are reduced. Capacitance is inversely proportional to thicknesses of the oil coating.

In an embodiment, main bearing impedances are minimized and include less viscous lubricant. In an embodiment, the main bearings include a thicker oil film than the magnetic flux reducing circuit elements and conductive rolling-element devices. In another embodiment, the magnetic flux reducing circuit elements and conductive rolling-element devices are preloaded to reduce impedance. In another embodiment, the magnetic flux reducing circuit elements and conductive rolling-element devices have greater contact surface area than the main bearings to have less impedance than the main bearings.

Figure 7:
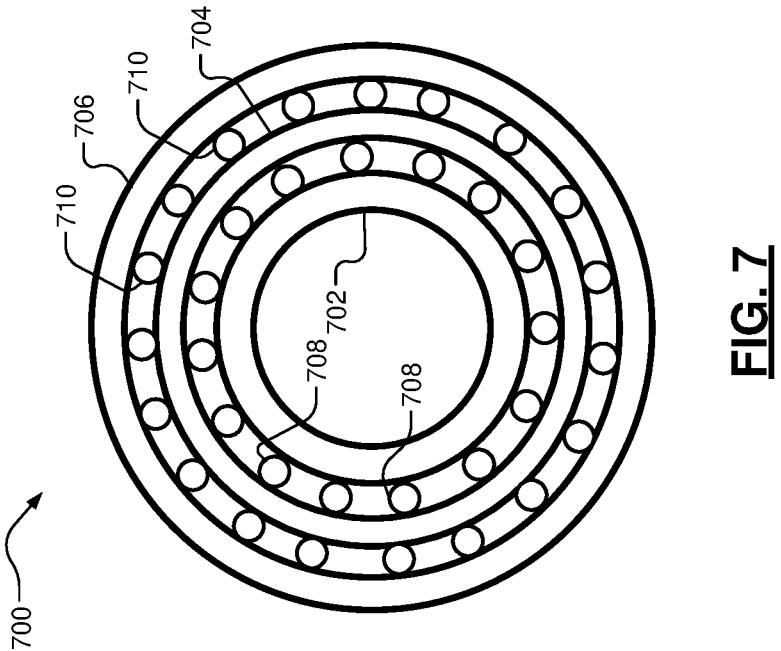
FIG. 7 is a cross-sectional view of stacked bearing arrangement in accordance with the present disclosure.

FIG. 7 shows a stacked bearing arrangement 700 that may be used instead of the main bearing arrangements shown in the other figures. The stacked bearing arrangement is provided as another example of how to increase impedance of main bearings for reduced bearing current through the main bearings. The stacked bearing arrangement 700 includes an inner ring 702, an intermediary ring 704, and an outer ring 706. A first set of bearing balls or bearing rollers 708 are disposed between and ride on tracks of the rings 702, 704. A second set of bearing balls 710 are disposed between and ride on tracks of the rings 704, 706. The stacked bearing arrangement 700 may also be used to reduce gear current (or leakage current) to a gearbox. The stacked bearing arrangement 700 increases impedance over a main bearing having a non-stacked arrangement to reduce bearing current through the bearings and gear current if applicable. The stacked bearing arrangement 700 may also replace bearings of a gearbox to reduce leakage current into and/or through the gearbox. The sets of bearing balls 708, 710 are stacked radially. The sets of bearing balls 708, 710 can also be stacked axially.

Figure 8:
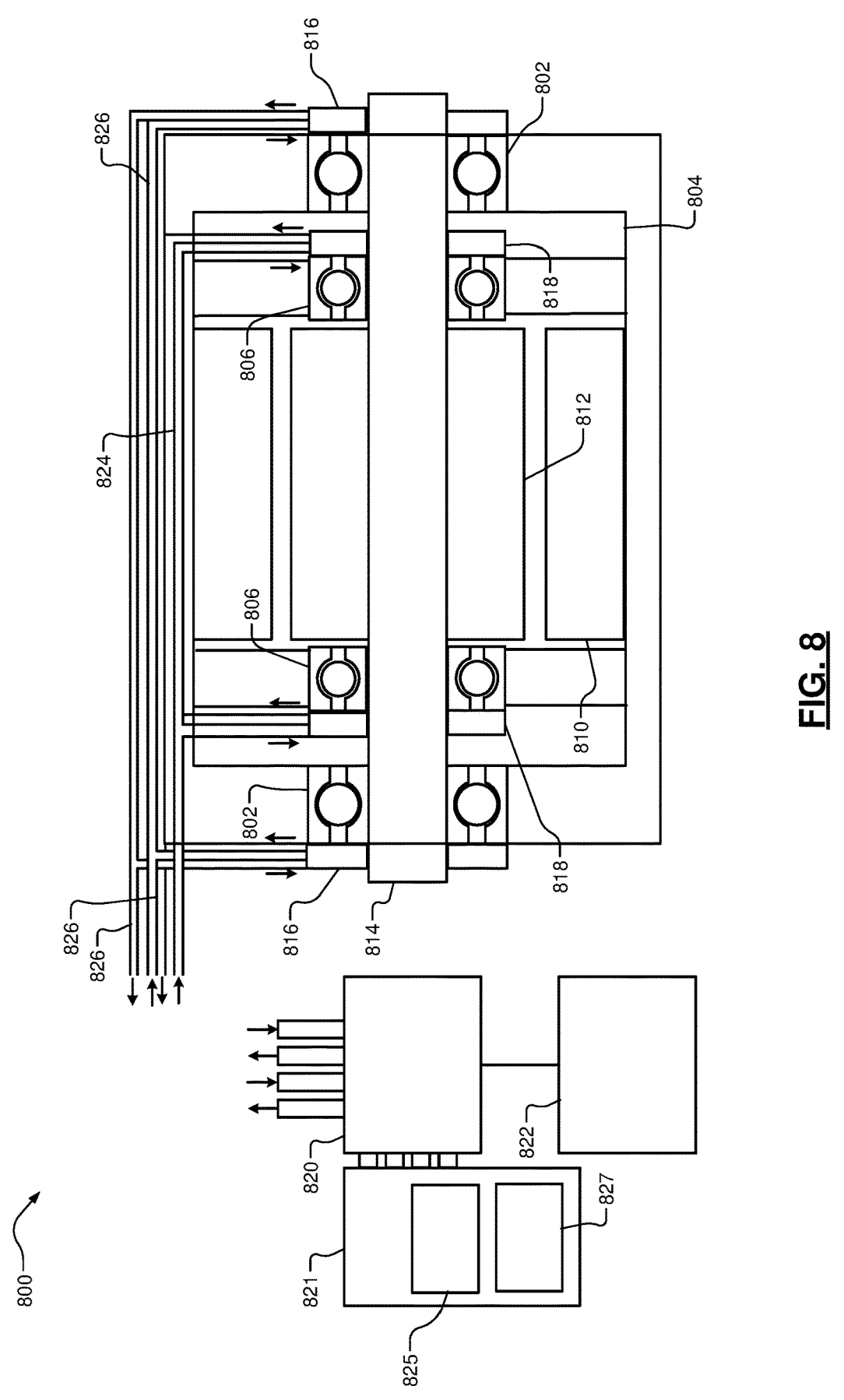
FIG. 8 is a cross-sectional view of a parallel temperature control circuit for independently controlling temperatures of main bearings and conductive rolling-element devices in accordance with the present disclosure.

FIG. 8 shows a parallel temperature control circuit 800 for independently controlling temperatures of main bearings 802 of a motor 804 and conductive rolling-element devices 806. The motor 804 includes a stator 810 and a rotor 812, and a main shaft 814. The main bearings 802 have respective temperature-controlled elements (e.g., plates, rings, loops, etc.) 816. The conductive rolling-element devices 806 have respective temperature-controlled elements (e.g., plates, rings, loops, etc.) 818. The temperature-controlled elements 816, 818 receive respective fluids from a pumping circuit 820, which may include one or more pumps, valves, flow controllers, etc. The pumping circuit 820 is controlled by a control module 822. A first fluid is supplied from the pumping circuit 820 to the temperature-controlled elements 816. A second fluid is supplied from the pumping circuit 820 to the temperature-controlled elements 818. The pumping circuit 820 is fluidically connected to the fluid sources 821. In an embodiment, the first fluid is a coolant and is used to decrease temperatures of the elements 816, and the second fluid is used to increase temperatures of the elements 818. The control module 822 controls the temperatures of the fluids such that the first fluid is cooler than the second fluid. Fluid lines 824 connect the pumping circuit 820 to the elements 816. Fluid lines 826 connect the pumping circuit 820 to the elements 818. The control module 822 may control temperatures of the fluids independently via heating elements 825 (e.g., heaters, coils, etc.) and/or cooling devices 827 (e.g., heat exchangers, cold plates, etc.). The control module 822 may circulate the first fluid through the elements 816 and then subsequently through the elements 818, such that the fluid flowing through the elements 818 is warmer than the fluid flowing through the elements 816.

Although the elements 816, 818 are shown on certain sides of the bearings 802 and the conductive rolling-element devices 806, the elements 816, 818 may be on other sides of the bearings 802 and the conductive rolling-element devices 806. Also, the fluid flowing through the elements 816 and/or the elements 818 may also flow through the shaft 814. Heating the elements 818 thins the oil lubricant in the conductive rolling-element devices 806, which decreases impedances of the conductive rolling-element devices 806 for increased bearing current through the conductive rolling-element devices 806.

Figure 9:
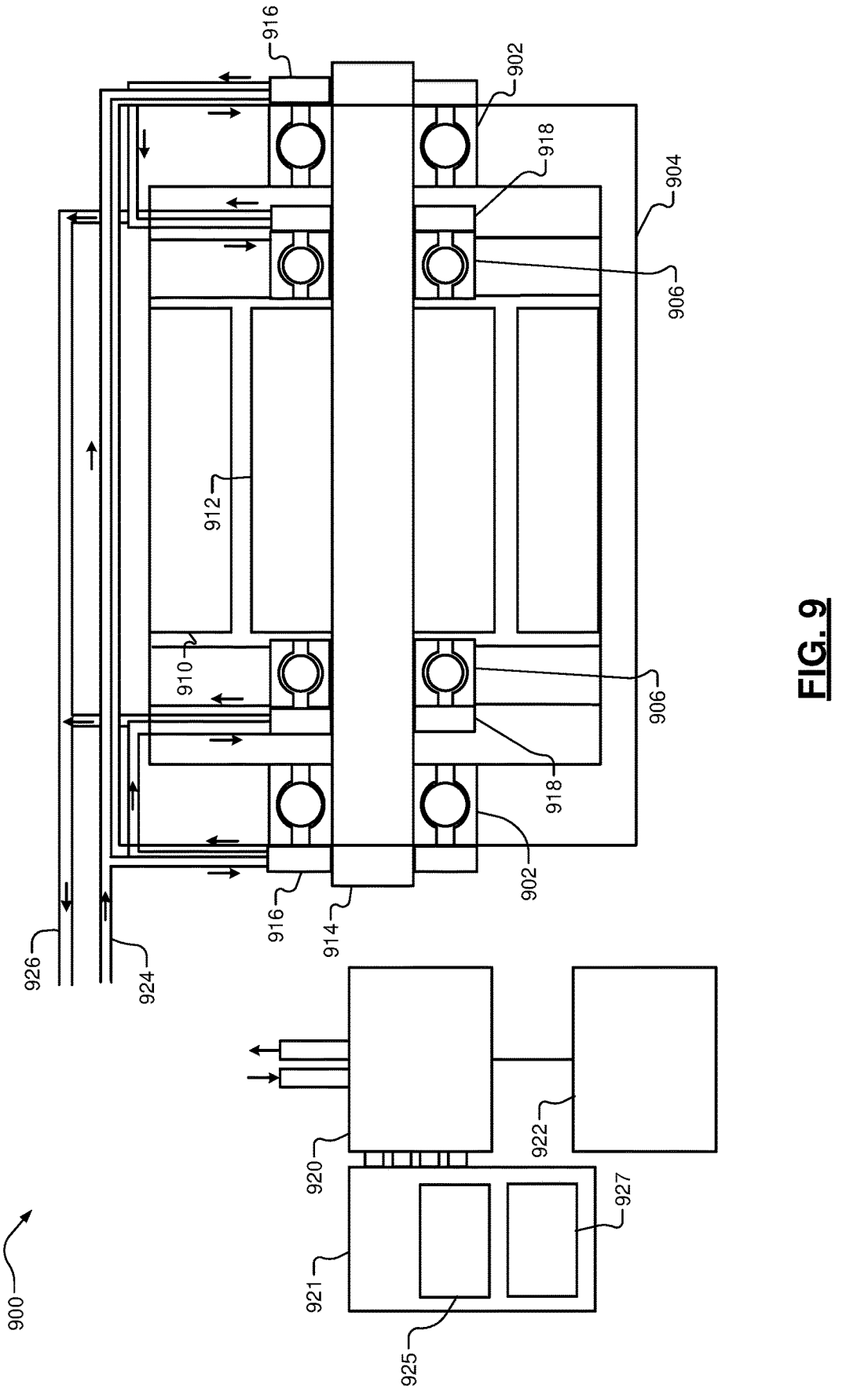
FIG. 9 is a cross-sectional view of a series temperature control circuit for controlling temperatures of main bearings and conductive rolling-element devices in accordance with the present disclosure.

FIG. 9 shows a series temperature control circuit 900 for controlling temperatures of main bearings 902 of a motor 904 and conductive rolling-element devices 906. The motor 904 includes a stator 910 and a rotor 912, and a main shaft 914. The main bearings 902 have respective temperature-controlled elements (e.g., plates, rings, loops, etc.) 916. The conductive rolling-element devices 906 have respective temperature-controlled elements (e.g., plates, rings, loops, etc.) 918. The temperature-controlled elements 916, 918 receive respective fluids from a pumping circuit 920, which may include one or more pumps, valves, flow controllers, etc. The pumping circuit 920 is controlled by a control module 922. A fluid is supplied from the pumping circuit 920 to the temperature-controlled elements 916 and then from the elements 916 to the elements 918. The pumping circuit 920 is fluidically connected to the fluid sources 921. Fluid lines 924 are supply lines and fluid lines 926 are return lines. The control module 922 may control temperatures of the fluids independently via heating elements 925 (e.g., heaters, coils, etc.) and/or cooling devices 927 (e.g., heat exchangers, cold plates, etc.). The fluid flowing through the elements 918 is warmer than the fluid flowing through the elements 916.

Figure 10:
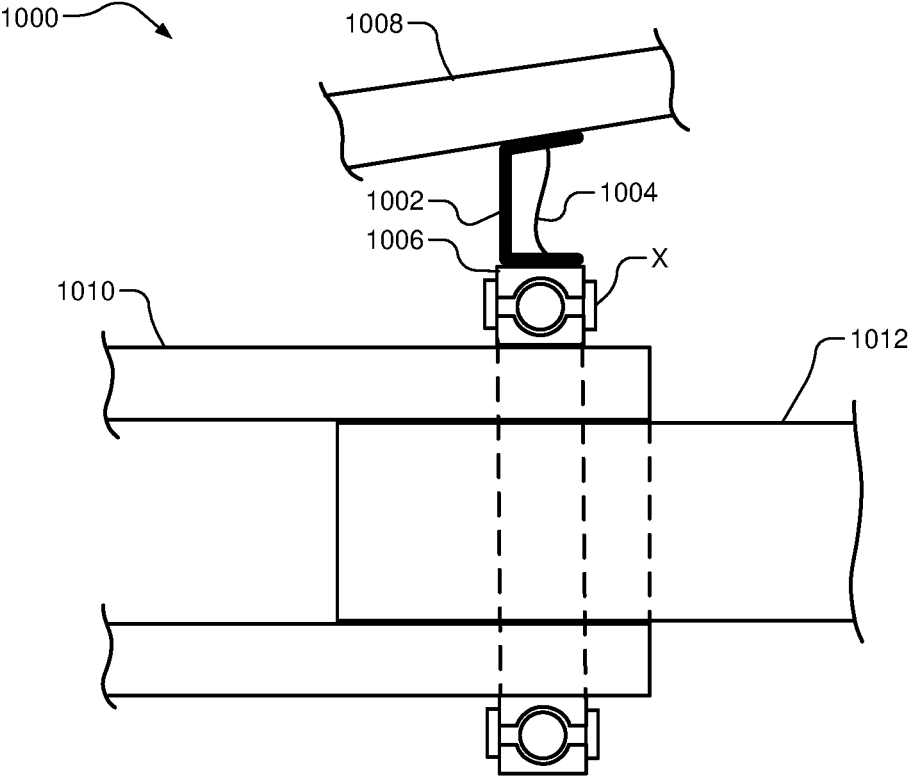
FIG. 10 a side cross-sectional view of a portion of a motor illustrating a support bracket and a grounding device in accordance with the present disclosure.

FIG. 10 shows a portion 1000 of a motor illustrating a support bracket 1002 and a grounding device 1004 that connect a magnetic flux reducing circuit element 1006 to a case 1008 of the motor. The magnetic flux reducing circuit element 1006 may be implemented as a conductive rolling-element device. In the example shown, the magnetic flux reducing circuit element 1006 is disposed on a first shaft 1010, which is connected to a second shaft 1012. The shafts 1010, 1012, rotate relative to the support bracket 1002 and a grounding device 1004. A frequency of bearing current in the motor may be, for example, 1-10 MHz. The high frequency can cause a "skin effect" where a majority of the current flowing through a wire is near the outer surface of the wire and not near the center (or core) of the wire. For this reason, the grounding device 1004 may be implemented as stranded braided wires, as a Litz wire, as a ribbon of wires, or as a solid or braided sheet to increase flow of current between the magnetic flux reducing circuit element 1006 and the case 1008, which is grounded. This reduces impedance of the grounding device 1004 and mitigates the skin effect.

The magnetic flux reducing circuit element 1006 may be implemented as and/or include a ball roller, roller bearing, a needle bearing, a thrust bearing, a journal bearing, etc. The magnetic flux reducing circuit element 1006 may be preloaded and include preloading elements. The preloading elements may be a bracket, such as the bracket 1002, and/or may include preloaded springs, seals, etc. The magnetic flux reducing circuit element 1006 may include conductive low impedance lubricant. The magnetic flux reducing circuit element 1006 may be implemented as a non-loaded conductive bearing for grounding and bypassing bearing current to ground. The bearing current is bypassed to ground instead of flowing through main bearings of the motor. By having the magnetic flux reducing circuit element 1006 on the shaft 1010 (or outer shaft), a shorter bearing current path is provided than if mounted on, for example, the inner shaft 1012.

The grounding device (or wire) 1004 may be used in parallel with one or more other grounding elements, such as a brush or slip clip. The brush or slip clip may also extend from the magnetic flux reducing circuit element 1006 to the case 1008 and/or from the shaft 1010 to the case 1008. One or more slip clips may be used to press the magnetic flux reducing circuit element 1006 against the shaft 1010. This may be done i) to reduce impedance of the series combination of the magnetic flux reducing circuit element 1006 and slip clips, and/or ii) to handle displacement and load variations from different directions.

Figure 11:
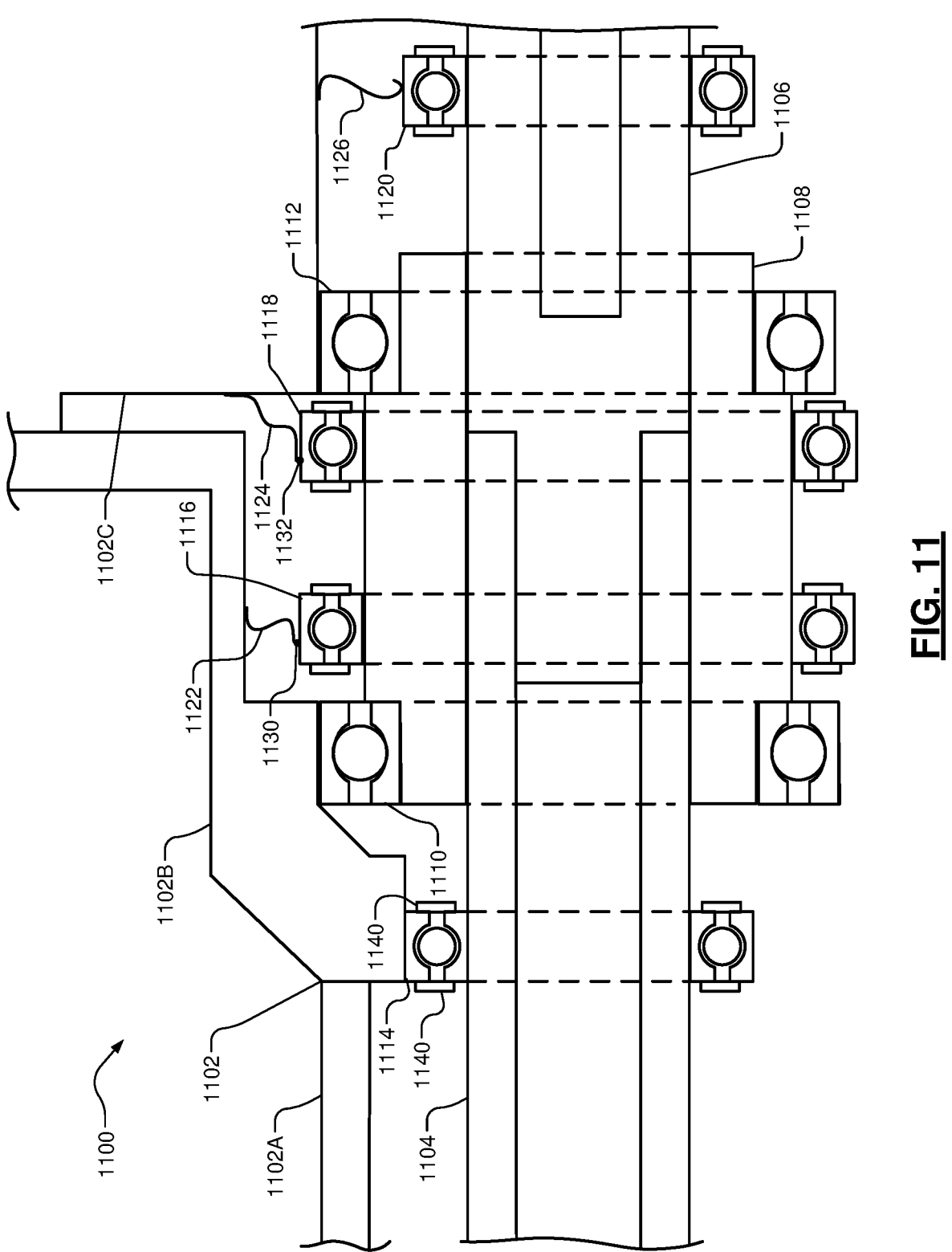
FIG. 11 is a side cross-sectional view of a portion of a motor illustrating different preloading elements and implementation locations for conductive rolling-element devices in accordance with the present disclosure.

FIG. 11 shows a portion 1100 of a motor illustrating different preloading elements for conductive rolling-element devices. The motor includes a case (or housing) 1102, a first shaft 1104, a second shaft 1106, and a coupler 1108 mounted on the first shaft 1104. The case 1102 includes multiple portions 1102A, 1102B, 1102C. The coupler 1108 is fixed to and rotates with the first shaft 1104. Two main bearings 1110, 1112 are mounted on the coupler 1108. Although not shown in FIG. 11, the first shaft 1104 may be rotated by a rotor of the motor. Conductive rolling-element devices 1114, 1116, 1118, 1120, which may be implemented as bearings are shown or may be conductive brushes and/or clips. Preloading elements 1122, 1124, 1126 are disposed respectively between the conductive rolling-element devices 1116, 1118, 1120 and the case 1102. The preloading elements 1122, 1124, 1126 may be implemented as springs, such as slip springs and may include wear-resistant tips 1130, 1132. The preloading elements 1122, 1124, 1126 may be implemented as and/or include a Litz wire, stranded and braided wire, a ribbon, etc. Each of the conductive rolling-element devices 1114, 1116, 1118, 1120 may include i) preloaded springs and/or seals (two are designated 1140 on the conductive rolling-element device 1114), and ii) conductive lubricant, for example, between bearing carriers and ball bearings. The preloading provided by the preloading elements 1122, 1124, 1126 reduces impedances of the conductive rolling-element devices 1116, 1118, 1120.

The conductive rolling-element device 1114 may be disposed and pressed between and in contact with the case 1102 and the first shaft 1104. The press fit can apply pre-loading to 1114, reducing the oil file thickness between the carrier and rolling elements. This reduces impedance of the conductive rolling-element device 1114. The conductive rolling-element device 1114 has a smaller inner diameter and thus smaller inner radius than the main bearings 1110, 1112. This reduces impedance of the conductive rolling-element device 1114, as compared to the main bearings 1110, 1112.

The conductive rolling-element device 1120 may be disposed on the second shaft 1106, which may be a slower shaft than the shaft 1104. This reduces the oil film thickness of the conductive rolling-element device 1120 such that the conductive rolling-element device 1120 has a lower impedance than each of the main bearings 1110, 1112. The conductive rolling-element device 1120 may be included and disposed next to and/or near a bearing of a gearbox to protect the bearing of the gearbox. The second shaft 1106 may be connected to a shaft of the gearbox.

Figure 12:
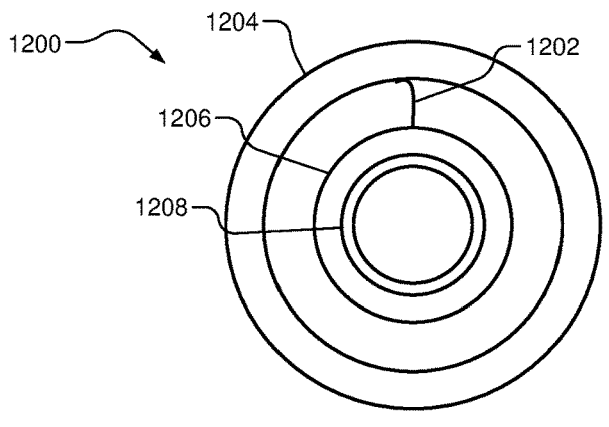
FIG. 12 is a cross-sectional view of a portion of a motor including a conductive rolling-element device and a preloading element in accordance with the present disclosure.
Figure 13:
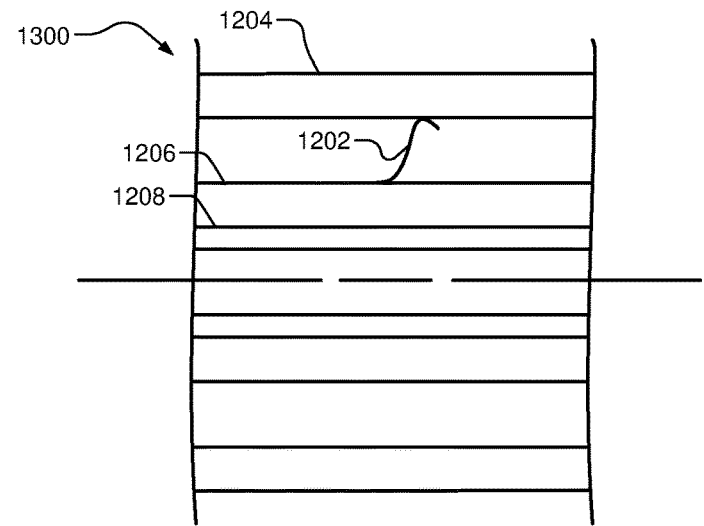
FIG. 13 is a side cross-sectional view of another portion of the motor of FIG. 12 including the conductive rolling-element device and the preloading element in accordance with the present disclosure.

FIG. 12 shows a portion 1200 of a motor including a preloading element 1202. The preloading element 1202 is disposed between a case 1204 and a conductive rolling-element device 1206. The conductive rolling-element device 1206 may be disposed on a tube 1208. In another embodiment, the preloading element 1202 is disposed between the conductive rolling-element device 1206 and the tube 1208. The tube 1208 may be a shaft, a cooling tube, a heating tube, or other tube. The preloading element 1202 may be implemented as a slip ring that slips along the rotating direction of the tube (or shaft) 1208. FIG. 13 shows another portion 1300 of the motor of FIG. 12 and the preloading element 1202 disposed between the case 1204 and the conductive rolling-element device 1206. The conductive rolling-element device 1206 is disposed on the tube 1208.

In FIGS. 11-13, the preloading elements, may be disposed between the conductive rolling-element devices and an upper portion of the corresponding case, such that if, for example, the corresponding shaft is bumped or jerked upward, the amount of preloading on the conductive rolling-element devices is increased due to compression of the preloading elements. In an embodiment, bearing preloading is provided in an opposite direction of a main bearing loading and fluting zone to compensate for oil fil thickness changes due to load or road shock. The thinner main bearing oil film thickness becomes, the more bending of preloading clips to decrease thicknesses of oil films of the conductive rolling-element devices to also reduce impedances of the conductive rolling-element devices.

Figure 14:
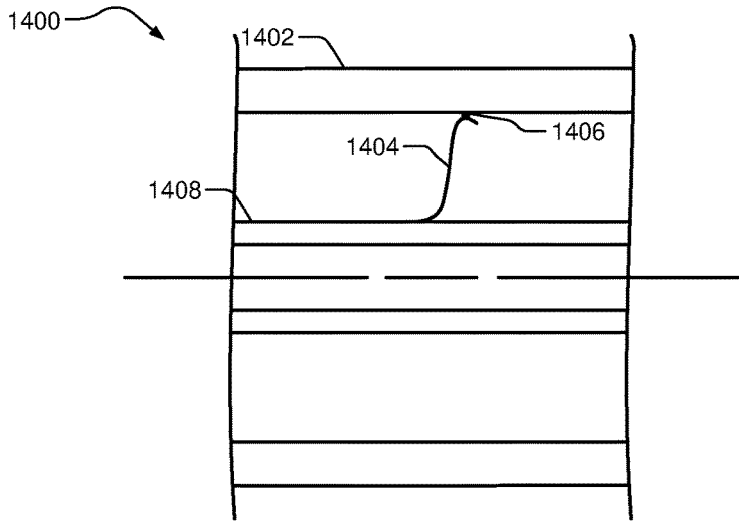
FIG. 14 is a side cross-sectional view of a portion of a motor including a case and a preloading element including a wear-resistant tip in accordance with the present disclosure.

FIG. 14 shows a portion 1400 of a motor including a case 1402 and a preloading element 1404 including a wear-resistant tip 1406. The preloading element 1404 is disposed between the case 1402 and a tube 1408, such as a shaft, a cooling tube, a heating tube, etc. No conductive rolling-element device is included.

Figure 15:
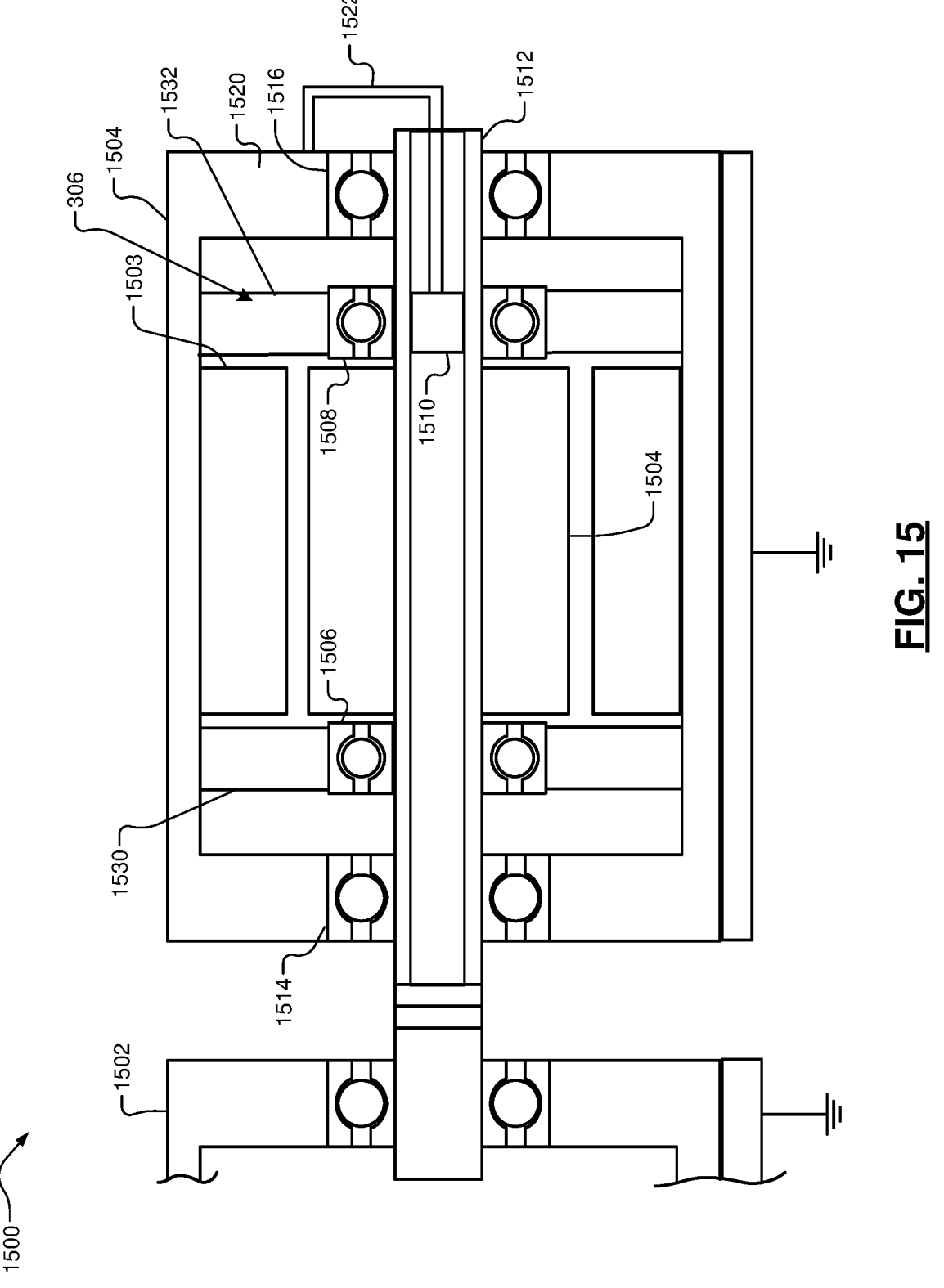
FIG. 15 is a functional block diagram of a motor system including a cross-sectional side view of an example gearbox and motor including conductive rolling-element devices disposed on inner and outer surfaces of a main shaft of a motor in accordance with the present disclosure.

FIG. 15 shows a motor system 1500 including an example gearbox 1502 and motor 1504 including a stator 1503, a rotor 1505, and conductive rolling-element devices 1506, 1508, 1510 disposed on inner and outer surfaces of a main shaft 1512 of the motor 1504. Although the conductive rolling-element devices 1506, 1508, 1510 are disposed inward of main bearings 1514, 1516, the conductive rolling-element devices 1506, 1508, 1510 may be loaded outward of the main bearings 1514, 1516. As an example, the conductive rolling-element device 1510 may be connected to a case 1520 via a conductive rigid element 1522, such as a bracket, rod, cooling tube, lubricant tube, inspection tube, or wiring tube, etc. The conductive rolling-element device 1510 and/or an inner bearing carrier thereof is fixed and connected to the conductive rigid element 1522. An outer bearing carrier of the conductive rolling-element device 1510 is connected to the shaft 1512 and rotates with the shaft 1512.

Although one inner conductive rolling-element device 1510 is shown, any number of conductive rolling-element devices may be included. Also, although the conductive rolling-element device 1510 is disposed inward of the main bearing 1516, the conductive rolling-element device 1510 may be disposed outward of the main bearing 1516 should the shaft 1512 extend outward of the main bearing 1516. Also, the conductive rolling-element device 1510 and/or other conductive rolling-element devices may be included without inclusion of the conductive rolling-element device 1506, 1508. By having the conductive rolling-element devices 1506, 1508, 1510 disposed on inner and outer surfaces of the shaft 1512, the conductive rolling-element devices 1506, 1508, 1510 address a skin effect associated with high frequency current passing through the shaft 1512 and having a majority of current flowing near inner and outer surfaces of the shaft 1512. Current flows through the devices 1506, 1508, 1510 and to or from the case 1520 via, for example, members of the case and/or extending from the case 1520, such as conductive members 1530, 1532 and the conductive rigid element 1522.

The conductive rolling-element devices disclosed herein may be implemented as grounding bearings, brushes, clips, slip rings, at various locations within and/or on a motor. The conductive rolling-element devices may be located to form shorter current paths and thus to have reduced corresponding impedance paths to bypass bearing current. The conductive rolling-element devices may be implemented to ground the main bearing or rotor shaft to eliminate EDM bearing current. The conductive rolling-element devices may be arranged to reduce magnetic flux across corresponding main bearings and the corresponding bearing current generated, where the voltage V applied to the rotor shaft of the motor is equal to $d\Phi/dt$. The main shaft of the motor may be grounded via the conductive rolling-element devices to reduce the CBC (or IBc), where IBc is equal to Vshaft/Rshaft, Rshaft being the resistance between points of the main shaft such as from end to end, from main bearing to main bearing, and/or from conductive rolling-element device to conductive rolling-element device.

The examples disclosed herein include bearing current countermeasure (BCC) devices and elements at least some of which including conductive devices (bearings, brush, spring, etc.) at various motor and gearbox locations to achieve improved performance and reliability with reduced cost and power loss. The BCC devices and elements i) reduce the CBC of main bearings by reducing $d\Phi/dt$, ii) bypass the CBC and the EDM bearing current by providing current dividers, and iii) are implemented as part of reduced impedance paths to bypass the EDM bearing current away from main bearings. At least some of the BCC devices and elements include conductive bearings with minimal electrical impedance to better mitigate CBC and EDM bearing current of main bearings. This includes skin effect mitigation. The conductive bearings include conductive/less-viscous lubricants, reducing oil film thicknesses, bearing preloading, increased contact area and/or increased number of rolling elements for increased bypassing of current away from the main bearings. The examples include grounding installation locations to reduce size and electrical impedance of the conductive bearings. The conductive bearings may be located on drive ends or non-drive ends of main shafts of motors, on either end of a gear shaft of a gearbox, inside or outside shafts, and/or directly on shafts, cooling tubes, heating tubes, etc. for improved electrical and thermal performance. The conductive bearings may have less impedance than main bearings of motors and bearings of gearboxes. The examples also enable adding a smaller low-cost AC choke to further reduce the BC flowing through the main bearings.

In an embodiment, the main bearings of the motors disclosed herein operate as high-pass filters and the magnetic flux reducing circuit elements and conductive rolling-element devices operate as low-pass filters. The cut-off frequencies of the high-pass filters may be at a frequency greater than a frequency of bearing current. The cut-off frequencies of the low-pass filters may be greater than the frequency of bearing current. For example, the high-pass filters may not let frequencies at or less than 5 MHz through. The low-pass filters may let frequencies at or below 5 MHZ through. The magnetic flux reducing circuit elements and conductive rolling-element devices have reduced impedances to allow passage of the bearing current unlike the main bearings that have high impedance and have minimal to no bearing current passing therethrough.

The preloading referred to herein may include axial and/or radial preloading. The preloading may be provided by rings, clips, springs, slip rings, and/or by an installation process. For example, a magnetic flux reducing circuit element or conductive rolling-element device may be press-fit to provide a thin low impedance element. The disclosed magnetic flux reducing circuit elements and conductive rolling-element devices may include lubricating oil film adapted for various speeds, loads, shocks, vibrations, displacements, fluid flow rates, viscosities, temperatures, etc.

The examples provide motor and/or cooling and bearing current mitigation concurrently. The examples provide increased lifetime of motors, gearboxes, and corresponding bearings and provide solutions that are small in size.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A motor system comprising:
a stator connected to a case of a motor;
main bearings connected to the case;
a main shaft rotating on the main bearings;
a rotor mounted on the main shaft and rotating relative to the stator; and
at least one of a plurality of magnetic flux reducing circuit elements and a plurality of conductive rolling-element devices disposed inward of the main bearings and closer to the stator and the rotor than the main bearings and reducing flow of bearing current through the main bearings,
wherein
the main shaft, the case, and the at least one of the plurality of magnetic flux reducing circuit elements and the plurality of conductive rolling-element devices define at least a portion of a conductive loop, and
the conductive loop reduces flow of the bearing current through the main bearings.

2. The motor system of claim 1, wherein the at least one of the plurality of magnetic flux reducing circuit elements and the plurality of conductive rolling-element devices consist of a plurality of ring-shaped bearings.

3. The motor system of claim 1, wherein the at least one of the plurality of magnetic flux reducing circuit elements and the plurality of conductive rolling-element devices comprise a conductive bearing, or spring in contact with an exterior surface of the main shaft.

4. The motor system of claim 1, wherein the at least one of the plurality of magnetic flux reducing circuit elements and the plurality of conductive rolling-element devices reduce or eliminate electrical discharge machining bearing current through the main bearings.

5. The motor system of claim 1, wherein the motor system comprises the plurality of conductive rolling-element devices, which are disposed on an exterior surface of the main shaft.

6. The motor system of claim 1, wherein the at least one of the plurality of magnetic flux reducing circuit elements and the plurality of conductive rolling-element devices are disposed within the main shaft.

7. The motor system of claim 1, wherein the at least one of the plurality of magnetic flux reducing circuit elements and the plurality of conductive rolling-element devices at least one of i) operate as a current divider, and ii) reduce an amount of change in magnetic flux of the motor.

8. The motor system of claim 1, wherein the at least one of the plurality of magnetic flux reducing circuit elements and the plurality of conductive rolling-element devices ground the main shaft.

9. The motor system of claim 1, wherein the at least one of the plurality of magnetic flux reducing circuit elements and the plurality of conductive rolling-element devices have less impedance than one of the main bearings.

10. The motor system of claim 1, wherein the at least one of the plurality of magnetic flux reducing circuit elements and the plurality of conductive rolling-element devices comprises-comprise conductive fluid.

11. The motor system of claim 1, wherein the at least one of the plurality of magnetic flux reducing circuit elements and the plurality of conductive rolling-element devices are preloaded.

12. The motor system of claim 1, wherein the at least one of the plurality of magnetic flux reducing circuit elements and the plurality of conductive rolling-element devices have at least one of i) a smaller inner diameter, and ii) a smaller outer diameter than one of the main bearings.

13. The motor system of claim 1, further comprising a preloading element extending from the at least one of the plurality of magnetic flux reducing circuit elements and the plurality of conductive rolling-element devices to a member of the case, wherein the preloading element preloads the at least one of the plurality of magnetic flux reducing circuit elements and the plurality of conductive rolling-element devices, and wherein the preloading element includes at least one of a wire, a stranded and braided wire, a Litz wire, a ribbon, and a slip spring.

14. The motor system of claim 1, wherein at least one of the main bearings comprises a stacked ball bearing arrangement.

15. The motor system of claim 1, further comprising:
a pair of temperature-controlled elements disposed adjacent the main bearings;
a first set of fluid lines circulating a first fluid through the pair of temperature-controlled elements;
another temperature-controlled element disposed adjacent the at least one of the plurality of magnetic flux reducing circuit elements and the plurality of conductive rolling-element devices; and
a second set of fluid lines circulating the first fluid or a second fluid through the another temperature-controlled element, wherein fluid flowing through the another temperature-controlled element is warmer than fluid flowing through the pair of temperature-controlled elements.

16. The motor system of claim 15, wherein the first set of fluid lines is not connected to and is independent of the second set of fluid lines.

17. The motor system of claim 15, further comprising:

a pumping circuit configured to control flow of the first fluid to and from the first set of fluid lines and flow of the first fluid or the second fluid to and from the second set of fluid lines; and a control module configured to control operation of the pumping circuit to control temperatures of the main bearings and the at least one of the plurality of magnetic flux reducing circuit elements and the plurality of conductive rolling-element devices.

18. A motor system comprising:

a stator connected to a case of a motor;

main bearings connected to the case;

a main shaft rotating on the main bearings;

a rotor mounted on the main shaft and rotating relative to the stator; and at least two magnetic flux reducing circuit elements disposed outward of the main bearings and further from the stator and the rotor than the main bearings and reducing flow of bearing current through the main bearings, wherein
  the at least two magnetic flux reducing circuit elements, the main shaft, and the case define at least a portion of a conductive loop, and
  the conductive loop reduces flow of the bearing current through the main bearings.

19. A motor system comprising:

a stator connected to a case of a motor;

main bearings connected to the case;

a main shaft rotating on the main bearings;

a rotor mounted on the main shaft and rotating relative to the stator;

at least one of a magnetic flux reducing circuit element and a conductive rolling-element device configured to reduce flow of bearing current through the main bearings;

a pair of temperature-controlled elements disposed adjacent the main bearings;

a first set of fluid lines circulating a first fluid through the pair of temperature-controlled elements;

another temperature-controlled element disposed adjacent the at least one of the magnetic flux reducing circuit element and the conductive rolling-element device; and a second set of fluid lines circulating the first fluid or a second fluid through the another temperature-controlled element, wherein fluid flowing through the another temperature-controlled element is warmer than fluid flowing through the pair of temperature-controlled elements.

* * * * *